(No Model.)
F. M. WATKINS.
STARCHING MACHINE.
No. 372,189. Patented Oct. 25, 1887.
Fig. 1. Fig. 2.
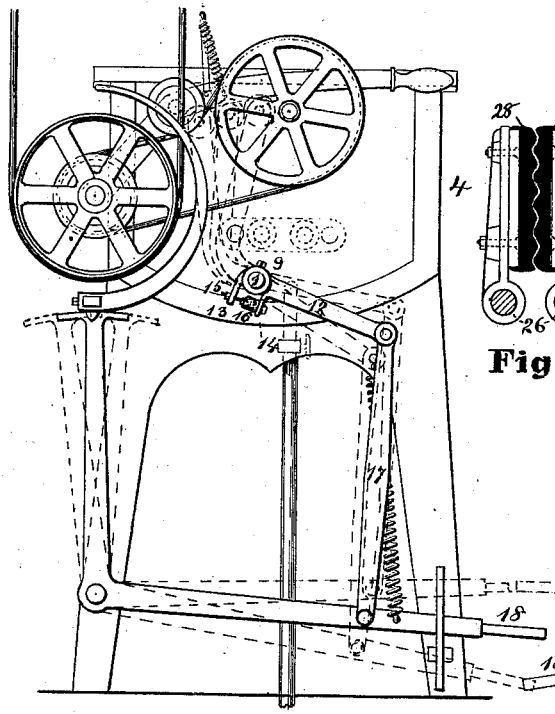
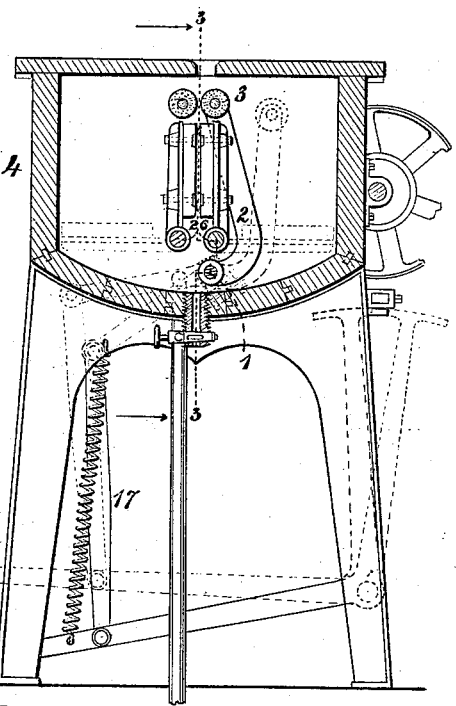
Fig. 5.
Fig. 3.
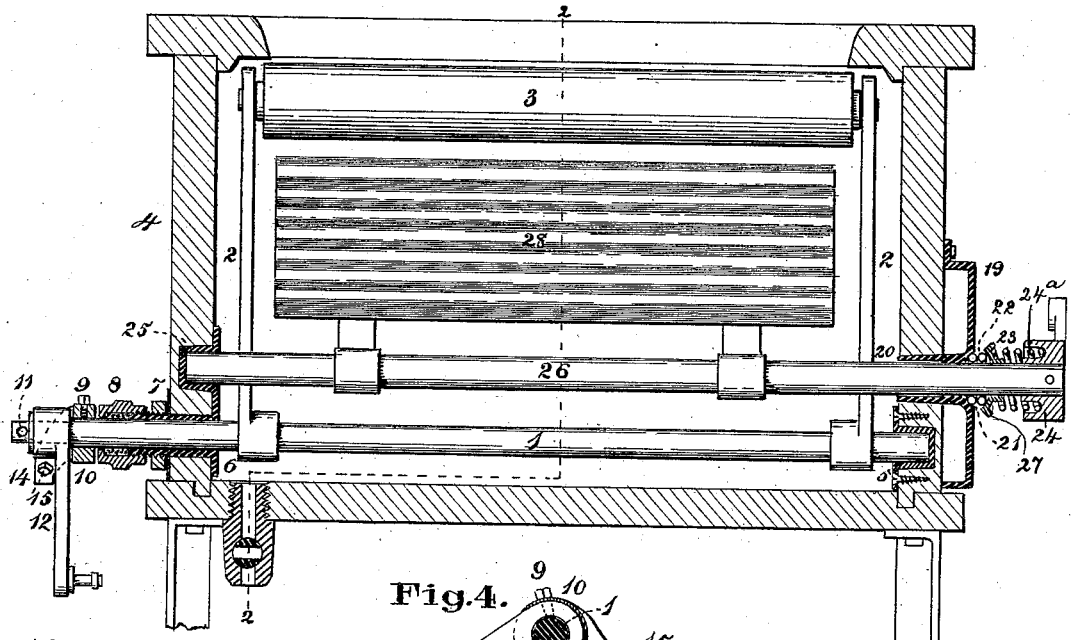
Fig. 4.
Attest:
Geo. H. Knight Jr.
H. B. Knight
Inventor:
Frank M. Watkins
By Knight Bros. Attys.
N. PETERS, Photo-Lithographer, Washington, D. C.

UNITED STATES PATENT OFFICE.

FRANK M. WATKINS, OF CINCINNATI, OHIO, ASSIGNOR OF ONE-HALF TO JOHN T. WEIGHELL, OF SAME PLACE.

STARCHING-MACHINE.

SPECIFICATION forming part of Letters Patent No. 372,189, dated October 25, 1887.

Application filed November 23, 1886. Serial No. 219,609. (No model.)

*To all whom it may concern:*

Be it known that I, FRANK M. WATKINS, of Cincinnati, Hamilton county, Ohio, have invented a new and useful Improvement in Starching-Machines, of which the following is a specification.

My invention is an improvement on that form of starching-machines for which Letters Patent No. 351,674 were granted to myself and John T. Weighell on the 26th October, 1886, and to which Letters Patent reference may be made for specific description of parts common to both machines.

My improvement consists in certain details of construction, hereinafter described, and pointed out in the claim.

In the accompanying drawings, Figure 1 is an elevation of that side of the machine through which (in my present improvement) protrudes one end of the arm-shaft of my shiftable roller. Fig. 2 is a section taken on the line 2 2, Fig. 3, looking toward the side shown in Fig. 1. Fig. 3 is a section on the line 3 3, Fig. 2. Fig. 4 shows my improved yielding attachment of treadle mechanism to arm-shaft of shiftable roller. Fig. 5 represents a form of my corrugated intermeshing rubber beaters.

The shaft 1, which carries the arms 2, in whose upper extremities is journaled my shiftable roller 3, is—in my present improvement—located within the tank 4, near the bottom thereof, as shown. One end of said shaft occupies a blind socket, 5, in the rear tank-wall. The other end of said shaft extends through an orifice in the front wall of the tank, having a bushing, 6. The said bushing 6, being screw-threaded outside of the tank, receives a nut, 7, by which it is tightly clamped to the tank-wall. The front extremity of said bushing is screw-threaded for a stuffing-box, 8. Fastened by a set-screw, 9, to that part of the said shaft which protrudes in front of the stuffing-box is a collar, 10, and in front of this collar there is secured—by key 11 or other means—an arm, 12, which is loosely sleeved upon said shaft. The collar 10 and the arm 12 have similar lugs, 13 14, suitable orifices in which receive a bolt, 15, that carries a rubber or other cushion, 16. This device causes the action of the arm 12 on the shaft 1, and through it on the shiftable roller, to be an elastic one, and to thus enable considerable inequalities in the article under treatment to escape between the rollers in the acts of wringing and discharging without injury to either machine or fabrics. The arm 12 is connected, by means of a rod, 17, with a treadle, 18, whose construction and functions, being otherwise identical with those of my said patent, require no specific explanation.

To prevent leakage where the beater-shafts 26 emerge through the tank side, I form upon the plate 19, which carries the rear gearing, an inwardly-extending bushing, 20, which, occupying an orifice in the tank-wall, incloses the beater-shaft. At the point of emergence of the shaft the plate 19 has a countersink, 21, to receive one or more rubber rings or gaskets, 22, which are pressed into said countersink by a correspondingly-countersunk washer, 27, on a spring, 23, whose other end bears in a groove, 24ª, against an arm, 24, whose form and functions, being identical with the corresponding member in my former patent aforesaid, need not be more particularly described. The other ends of the two beater-shafts occupy blind sockets 25, which may be integral with the casting that serves as the bushing 6 of the roller-arm shaft 1.

The herein-described preferred form of my invention is susceptible of various modifications. For example, a spiral or a helical spring might be substituted for the rubber cushion 16, and, on the other hand, rubber might be used instead of the metallic spring 23. For some fabrics the beaters may be faced with corrugated rubber, as shown at 28, the ribs and the grooves of the corrugations being parallel with the shafts, and the beaters folding together and opening away from each other, like a book in closing and opening, respectively, the corrugations gradually intermeshing from the bottom to the top of the beaters, and vice versa.

I claim herein as new and of my invention—

The yielding attachment of the treadle arm 12 to the shiftable roller-arm shaft 1, consisting of the combination of the collar 10, fastened to the said shaft 1 and having the lug 13, the lug 14 upon said arm 12, and the bolt 15, carrying the spring or cushion 16, as set forth.

In testimony of which invention I hereunto set my hand.

FRANK M. WATKINS.

Attest:
GEO. H. KNIGHT,
E. M. WILLIAMS.